(12) United States Patent
Webber, Jr. et al.

(10) Patent No.: US 6,381,213 B1
(45) Date of Patent: *Apr. 30, 2002

(54) METHOD AND APPARATUS FOR DETECTING COLLISIONS ON A NETWORK

(75) Inventors: Harold H. Webber, Jr., Lafayette; Jeremiah Jeffress, Orinda, both of CA (US)

(73) Assignee: Tut Systems, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/307,258

(22) Filed: May 6, 1999

Related U.S. Application Data

(63) Continuation of application No. 08/925,043, filed on Sep. 8, 1997, now Pat. No. 5,963,539.

(51) Int. Cl.⁷ .......................... H03K 7/08; H04L 12/413
(52) U.S. Cl. ...................... 370/213; 370/445; 370/461; 375/239
(58) Field of Search ................................ 370/212, 213, 370/445, 447, 448, 461, 462, 509, 514; 375/238, 239, 362, 364; 340/825.06, 825.07, 825.16, 825.17; 341/52, 53, 178, 182, 183

(56) References Cited

U.S. PATENT DOCUMENTS

| | | | |
|---|---|---|---|
| 4,706,246 A | 11/1987 | Kume | |
| 4,785,396 A | * 11/1988 | Murphy et al. | 370/85 |
| 4,817,115 A | 3/1989 | Campo | |
| 5,151,698 A | 9/1992 | Pophillat | |
| 5,162,791 A | * 11/1992 | Heegard | 340/825.5 |
| 5,339,307 A | * 8/1994 | Curtis | 370/13.1 |
| 5,450,596 A | 9/1995 | Aden | |
| 5,515,035 A | 5/1996 | Gut | |
| 5,548,614 A | 8/1996 | Stoll et al. | |
| 5,587,692 A | 12/1996 | Graham | |
| 5,614,901 A | 3/1997 | Haas | |
| 5,657,326 A | * 8/1997 | Burns et al. | 370/349 |
| 5,696,790 A | 12/1997 | Graham | |

* cited by examiner

*Primary Examiner*—Alpus H. Hsu
(74) *Attorney, Agent, or Firm*—Blakely, Sokoloff, Taylor & Zafman, LLP.

(57) ABSTRACT

A method to detect a collision on a carrier medium, such as UTP or POTS wiring, commences with a transmission of a first identifier for a network device over the carrier medium. The first identifier comprises a first series of pulses transmitted over a first time interval. Each pulse of the first series has a respective temporal location within the first time interval. A second identifier comprising a second series of pulses is received at the network device over a second time interval. A determination is made as to whether the first identifier corresponds to the second identifier and, if not, a collision is detected on the carrier medium. The determination of whether the first and second identifiers correspond may comprise determining whether the respective temporal locations, within the first time interval, of each pulse of the first series of pulses corresponds to a respective temporal location, within the second time interval, of a pulse in the second series of pulses.

21 Claims, 16 Drawing Sheets

FIG. 10b →

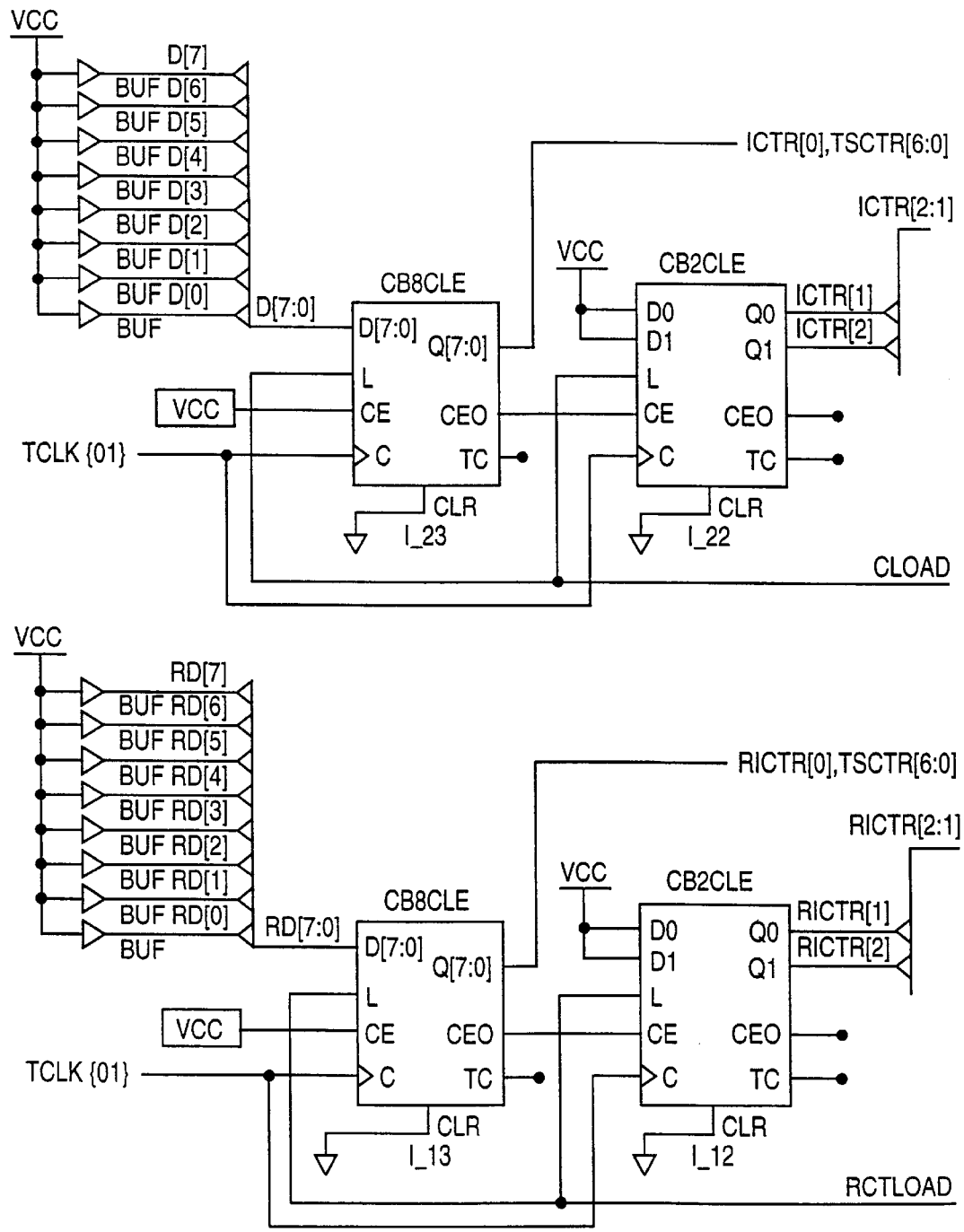
FIG. 14a          FIG. 14b →

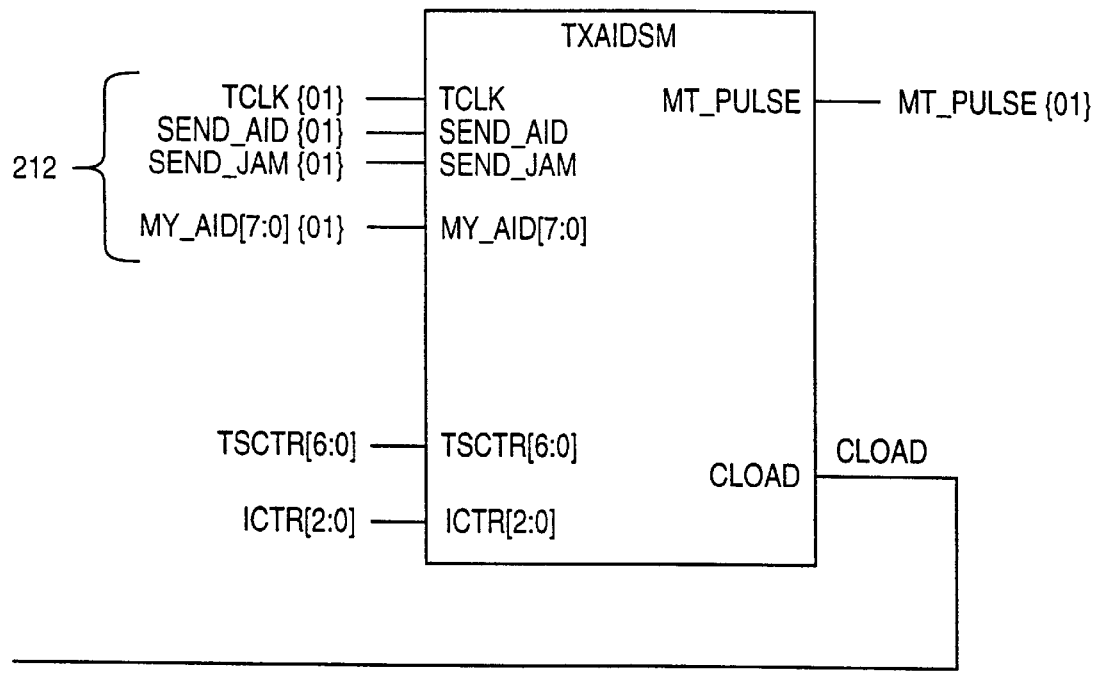
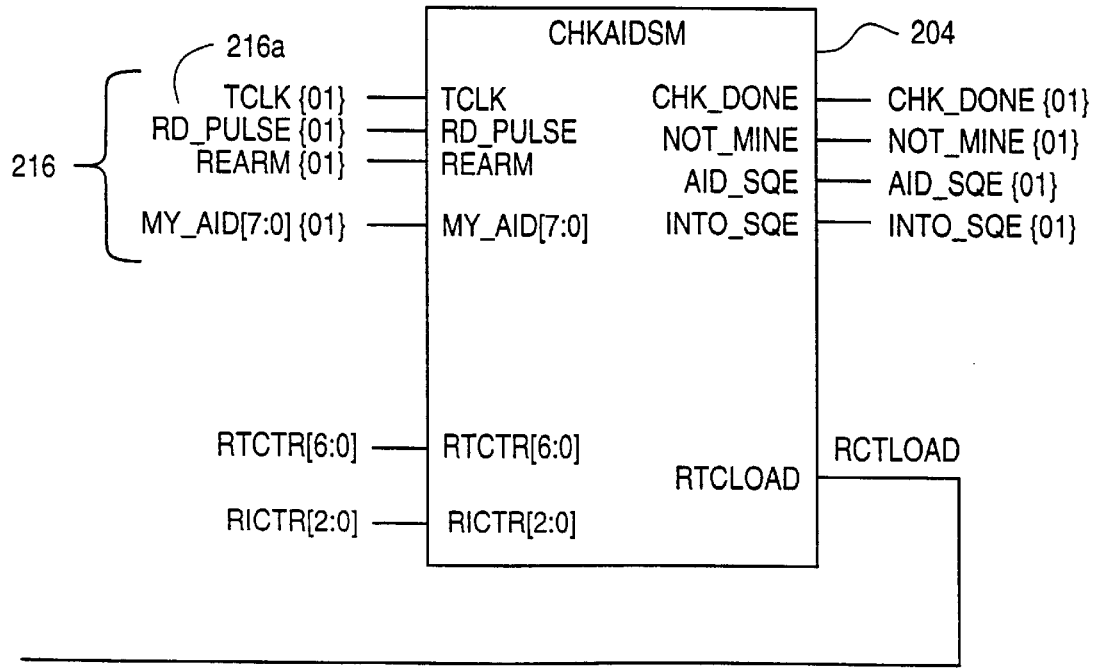
← FIG. 14a    FIG. 14b

METHOD AND APPARATUS FOR DETECTING COLLISIONS ON A NETWORK

The present application is a continuation application of application Ser. No. 08/925,043, filed Sep. 8, 1997, issued as U.S. Pat. No. 5,963,539.

FIELD OF THE INVENTION

The present invention relates generally to the field of data networking. More specifically, the present invention relates to the detection of collisions between transmitted signals on a network.

BACKGROUND

Ethernet networks implement a Carrier Sense, Multiple Access/Collision Detect (CSMA/CD) protocol to ensure that only one node (or station) of the relevant Ethernet network is propagating a signal over a carrier medium of the network at any given time. As implied by the "Carrier Sense" aspect of this protocol, prior to or during signal transmission, a station checks or listens on the relevant carrier medium to determine whether another station is transmitting. Merely for example, an inquiring station may sense a voltage on a network line, and then assume that another station is transmitting.

In view of the distances between stations on a network and finite signal propagation times, it often occurs that a station wishing to transmit will sample the relevant carrier medium, and sense no traffic thereon, even though another station may have begun transmitting. Accordingly, two stations will simultaneously transmit, resulting in a collision of transmitted signals. The delay in detection of transmission of a signal over the carrier medium because of the spacing of stations thereon has resulted in a so-called "slot time" being defined as a function of the time required for the transmission of a signal by a first station, the possible "Carrier Sense" detection of this signal by a second station of the network, and the return of a collision detect signal by the second station to the first station. It will be appreciated that the possibility of colliding transmission signals occurs during this slot time.

In Ethernet networks where the carrier medium comprises a regular and well-designed wiring system, constructed using a high-quality cable, the detection of collisions may be performed by detecting voltage swings on the carrier medium that exceed the voltage that can be generated by one transmitter alone. However, where the carrier medium of the network displays a number of undefined characteristics, the above collision detection methodologies may be unreliable. For example, where the carrier medium comprises existing telephone wiring within a residence (e.g., Plain Old Telephone Service (POTS) wiring), the wiring may comprise unshielded, twisted-pair (UTP) telephone cable and may be either Category One or Category Two cable as defined by the EIA/TIA 568 specification. Accordingly, the wiring may be susceptible to noise. Further, the use of residential telephone wiring as the carrier medium for the network poses a number of problems as the transmission of data signals must occur over an arbitrary, unterminated wiring system with unknown electrical characteristics. This results in impedance mismatches, and the lack of termination contributes significantly to the persistence of reflections of signals and to unpredictable peaks and valleys in frequency response within a band of interest. The power-splitting effect of star configurations, which are commonly implemented in residential wiring, increases these problems.

SUMMARY OF THE INVENTION

According to one aspect of the present invention, there is provided a method of detecting a collision on a network. A first identifier of a first network device is transmitted over a carrier medium. The first identifier comprises a first series of pulses transmitted over a first time interval. Each pulse has a respective temporal location within the first time interval. A second identifier, comprising a second series of pulses, is received over a second time interval at the network device. A determination is made as to whether the first identifier corresponds to the second identifier and, if not, then a collision is detected on the carrier medium. The determination includes determining whether the respective temporal locations, within the first time interval, of each pulse of the first series of pulses corresponds to a respective temporal location, within the second time interval, of a pulse within the second series of pulses.

BRIEF DESCRIPTION OF THE DRAWINGS

The present invention is illustrated by way of example, and not limitation, in the figures of the accompanying drawings in which like references indicate similar elements.

FIG. 6 illustrates a signal waveform resulting from the propagation of a pulse over the POTS wiring illustrated in FIG. 1a.

FIGS. 13 and 14 are schematic representations of three state machines which comprise a Media Access Controller (MAC) included within the modem shown in FIG. 10.

DETAILED DESCRIPTION

A method and apparatus for detecting a collision between signals transmitted over a network are described. In the following description, for the purposes of explanation, numerous specific details are set forth in order to provide a thorough understanding of the present invention. It will be evident, however, to one skilled in the art that the present invention may be practiced without these specific details.

Apparatus-Overview

Figure 1A:
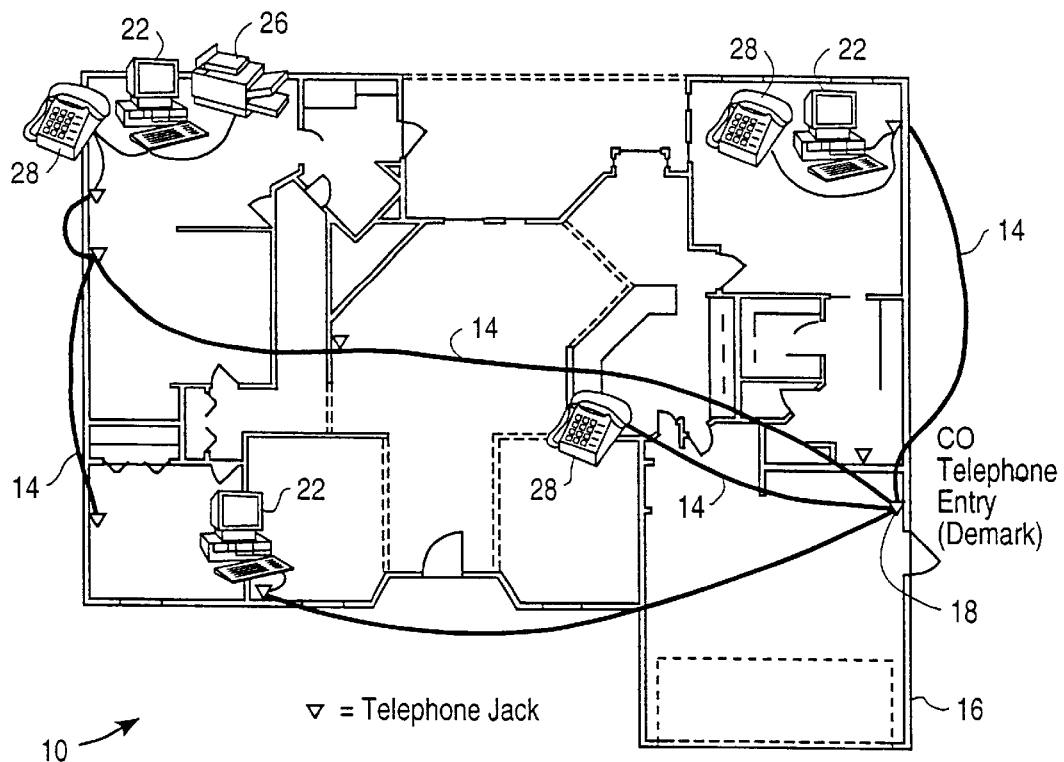
FIGS. 1a and 1b illustrate respective Local Area Networks (LANs) within which the present invention may be implemented.
Figure 1B:
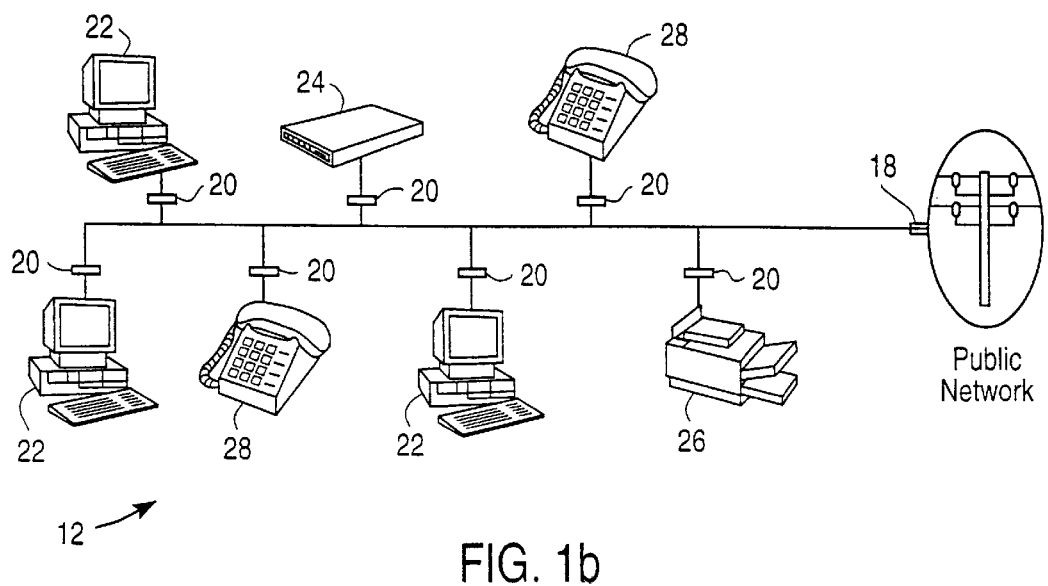

FIGS. 1a and 1b each illustrate a respective Local Area Network (LAN) 10 and which may be implemented utilizing arbitrary topology POTS wiring 14, such as UTP wiring, within a residential building 16. The wiring 14 fans out from a central connection point 18, through which the wiring 14 connected to a central office, to numerous phone jacks 20 located throughout the building 16. A number of LAN devices (also termed "stations" or "nodes"), such as computers 22, modems 24 or printers 26, may be coupled to the wiring 14 via the jacks 20. Regular telephones 28 are also shown to,be coupled to the wiring 14 via respective jacks 20. A number of branches of the wiring 14 may furthermore terminate in a jack 20 into which a LAN device or telephone is not connected, and are accordingly unterminated. As will be appreciated from FIG. 1a, the wiring 14 interconnecting the LAN devices has an irregular topology, and includes a number of unterminated branches. Impedance mismatches, the arbitrary topology, and the lack of termination within the LANs 10 and 12 result in the reflection of signals and unpredictable frequency responses within these LANs 10 and 12. Further, the star configuration illustrated in FIG. 1a serves to attenuate the levels of signal features whose duration is short compared to the propagation delay of the wire branches.

Figure 2:
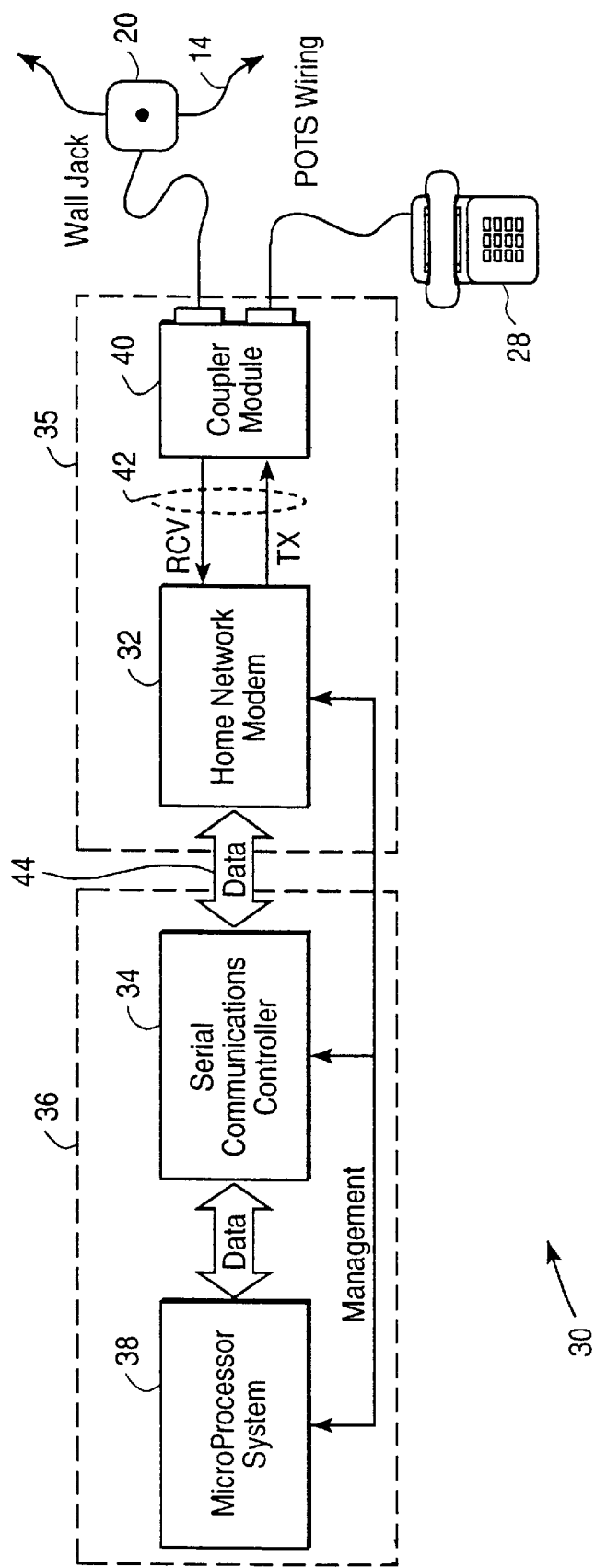
FIG. 2 is a block diagram of a network station including a modem within which the present invention may be implemented.

Turning now to FIG. 2, there is illustrated a network station 30 coupled to a LAN via uncharacterized, arbitrary topology wiring, such as the POTS wiring 14 illustrated in FIGS. 1a and b. While network station 30 is described below as implementing the Ethernet protocol, it will be appreciated that the teachings of the present invention can also be applied to other well-known networking protocols. Merely for example, the teachings of the present invention could be extended to any network implementing BISYNC or HDLC framing, Collision Detecting, Collision Avoiding, TDMA, and Polled or Token Passing access methods.

An overview of the various components of the network station 30 will now be provided. The station 30 comprises a network device 36 and an adapter 35. The adapter 35 includes a modem 32 that serves to adapt a communications controller 34 of the network device 36 (such as a computer) for communication over the arbitrary POTS wiring 14.

In the illustrated embodiment, the communications controller 34 is an Ethernet communications controller operating according to the IEEE 802.3 standard. In an alternative embodiment, the communications controller may simply be a serial data interface or microprocessor, and the modem 32 may incorporate a Media Access Controller (MAC) 70 that interfaces a data stream from the controller 34 to circuitry within the modem 32 via an interface such as the General Purpose Serial Interface (GPSI) 60 described below.

The modem 32 provides medium interface, signal encoding and decoding (ENDEC), clock recovery and collision detection functions. To accommodate a variable bit rate encoding/decoding scheme, and to control the flow the data between the network device 36 and the wiring 14, the modem 32 controls the clocking of data to and from the communications controller 34. The modem 32 may further support Carrier Sense Multiple Access/Collision Detection (CSMA/CD) based Media Access Control (MAC) layers and accordingly provides carrier detect and collision indication signals, as is explained in further detail below. The modem 32 is furthermore shown to be coupled to a microprocessor system 38 of the network device 36 via a management interface, which allows the modem 32 to be controlled by software executing within the microprocessor system 38. The adapter 35 further incorporates a coupler module 40 by which the network station 30 is coupled to the jack 20 and POTS wiring 14. The coupler module 40 includes a pair of RJ-11 ports through which the wall jack 20 and the telephone 28 are coupled to the network device 36. The coupler module 40 is furthermore connected to the modem 32 via a transmit/receive connection 42.

A filter (not shown) is incorporated within the coupler module 40, and acts as a bandpass with a lower cutoff frequency of around 400 kHz and upper cutoff frequency around 4 Mhz. The filter is AC coupled to the wiring 14 to prevent interference with POTS operations. Further details of the coupler module 40 are not pertinent to an understanding of the present invention.

Referring now to the network device 36, the communications controller 34 is typically responsible for Link-Layer protocol functions, such as framing, error detection, address recognition and media access. The microprocessor system 38 is responsible for the execution of software which controls the controller 34 and the modem 32. The microprocessor system 38 is furthermore shown to be coupled to the communications controller 34 via a data bus 44, and the communications controller 34 is similarly coupled to the modem 32.

The adapter 35 thus allows a network device 36 including a communications controller 34, such as an Ethernet controller, to be coupled to a LAN implemented using POTS wiring 14, and serves to encode data transmitted from the network device 36 onto the LAN into a format suitable for propagation over the wiring 14. Similarly, the adapter 35 decodes signals received via the POTS wiring 14 into a format suitable for reception by the controller 34. While the adapter 35 is shown in FIG. 2 to reside outside the network device 36, it will be appreciated that the adapter 35 could in fact be incorporated within the network device as, for example, part of a Network Interface Card (NIC). Alternatively, the adapter 35 may comprise a stand alone unit which is coupled between a serial port of the network device 36 and the wall jack 20.

Figure 3:
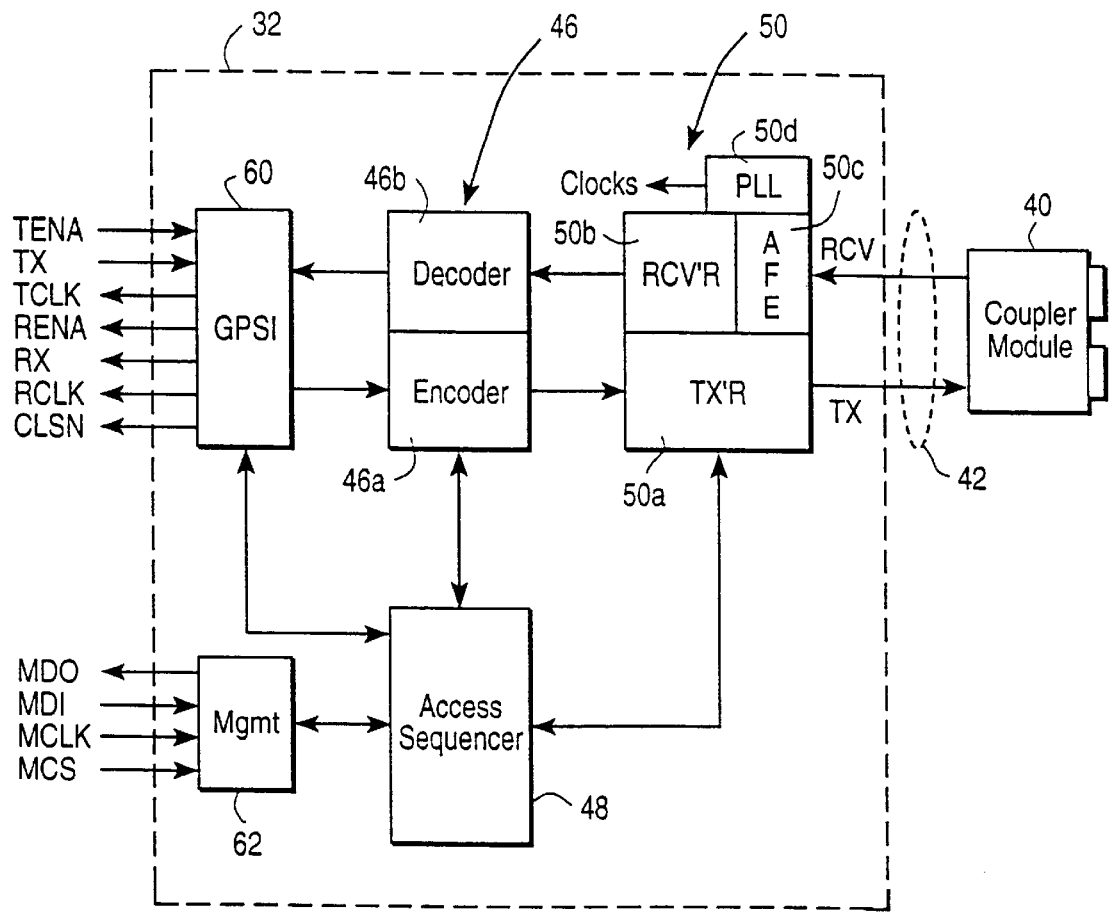
FIG. 3 is a block diagram of a modem, according to one embodiment of the present invention, for providing a connection between an Ethernet controller and POTS wiring.

FIG. 3 is a block diagram providing a more detailed view of the components of the modem 32. Specifically, the modem 32 comprises an encoder/decoder (ENDEC) 46 which is responsible for encoding a bit sequence as a symbol for transmission over a carrier medium such as the POTS wiring 14. Similarly, the ENDEC 46 is responsible for decoding a symbol received from the wiring 14 to generate a bit sequence. The encoding and decoding operations performed by the ENDEC 46 will be described in further detail below. The ENDEC 46 furthermore supplies both transmit and receive clocks to the communications controller 34 or, in an alternative embodiment, to a MAC within the modem 32. Overall operation of the ENDEC 46 is under the control of an access sequencer 48. The access sequencer 48 selects a general mode of operation for the ENDEC 46 and for the modem 32 as a whole, and controls the flow of data between the modem's subsystems and interfaces. The access sequencer 48 is also responsible for implementing collision detection within the modem 32.

The modem 32 further includes receiver/transmitter circuitry 50, which is responsible for the reception and transmission of symbols encoding bit sequences. In one embodiment of the invention, such symbols are delimited by electrical pulses, in which case a transmitter 50a receives symbol and polarity information, synchronized to a master clock, from the ENDEC 46. In one embodiment, the symbol information received at the transmitter 50a from the ENDEC 46 represents the variable-duration (or encoding) portion of a composite symbol to be propagated from the transmitter 50a. The transmitter 50a appends a fixed-duration (or buffer) portion to the variable-duration portion to generate the composite symbol. The transmitter 50a then generates symbol delimiters, which determine the time duration and polarity of the composite symbol, in the form of pulse doublets. Each pulse doublet comprises first and second portions of approximately equal duration and opposite polarity, and has a fixed pulse width. The polarity of each pulse doublet is determined by information received from the ENDEC 46. As each pulse doublet comprises two equal portions of equal duration and opposite polarity, no Direct Current (DC) component is generated on the wiring 14 when the pulse doublet is transmitted thereon. Compliance with FCC Part 68 requires that the voltage levels of each pulse doublet be substantially less than would be generated when driving the coupler module 40 at Transistor-Transistor Logic (TTL) levels. A reduction in the voltage levels of each pulse may be accomplished by incorporating a series of resistors, or step-down windings, in a coupling transformer within the circuitry 50. In one embodiment, each pulse doublet comprises a single cycle of a 2 mHz sine wave.

The circuitry 50 also includes a receiver 50b, which comprises gain elements, comparators and digital control circuitry. The receiver 50b produces an output pulse, coincident with a first peak (i.e. the inflection point) of a complex waveform received by the wall jack 20 off the wiring 14. The complex waveform may be highly attenuated and distorted as a result of being propagated through a residential POTS wiring 14, and reflections can result in a peak amplitude occurring sometime after arrival of the incident energy. Without line terminations and with complex topologies, pulse energy can continue for many microseconds, decaying gradually.

Referring again to FIG. 3, the modem 32 also includes system interfaces in the form of a General Purpose Serial Interface (GPSI) 60 and a management interface 62. The GPSI 60 allows the modem 32 to control the clocking of data into and out of the communications controller 34. Table 1 below provides the details of the GPSI 60 signal lines:

TABLE 1

| Signal Name | Direction | Description |
| --- | --- | --- |
| TENA | To Modem | Transmit Enable. Qualifies TX as containing packet data |
| TX | To Modem | Transmit data to encoder |
| TCLK | From Modem | Transmit Clock. Runs continuously when TENA deasserted, stopped while Access ID, (detailed below) runs at variable rate under control of transmit encoder during transmission. |
| RENA | From Modem | Receive Enable. Qualifies RX as containing packet data. |
| RX | From Modem | Receive data from decoder. |
| RCLK | From Modem | Receive Clock. Runs continuously when the wire is idle, is stopped during reception of an Access ID. |

TABLE 1-continued

| Signal Name | Direction | Description |
| --- | --- | --- |
| | | (detailed below), runs at variable rate under control of the decoder during packet reception. |
| CLSN | From Modem | Collision Sense. Indicates either a transmit or receive mode collision. |

The management interface 62 is a simple 4-wire serial interface for setting and reading management configuration information. A microprocessor within the communications controller 34 uses the interface 62 to establish the speed of operation, and to set the access sequencer's 48 mode of operation. In one embodiment the communications controller 34 is an Ethernet controller, and the management parameters for the modem 32 are stored in a serial EEPROM, and loaded automatically every time the controller 34 is reset or initialized. Table 2 below details the relevant signal pins and management configuration data:

TABLE 2

| Signal Name | Direction | Description |
| --- | --- | --- |
| MDO | From Modem | Serial data stream readout of modem configuration parameters. |
| MDI | To Modem | Serial data stream settings of modem configuration parameters. |
| MCLK | To Modem | Serial data clock. Data is shifted in/out on the rising edge of this signal. |
| MCS | To Modem | Chip select. Qualifies and frames activity on the serial data channel. First data bit received/transmitted following assertion of this signal. Configuration data is loaded into internal registers upon transition to deasserted state. |

The receiver 50b further includes an Analog Front End (AFE) circuit 50c and a Phase-lock loop (PLL) circuit 50d. The AFE 50c shapes transmit pulses, and locates incident peaks of received waveforms (pulses).

Figure 4:
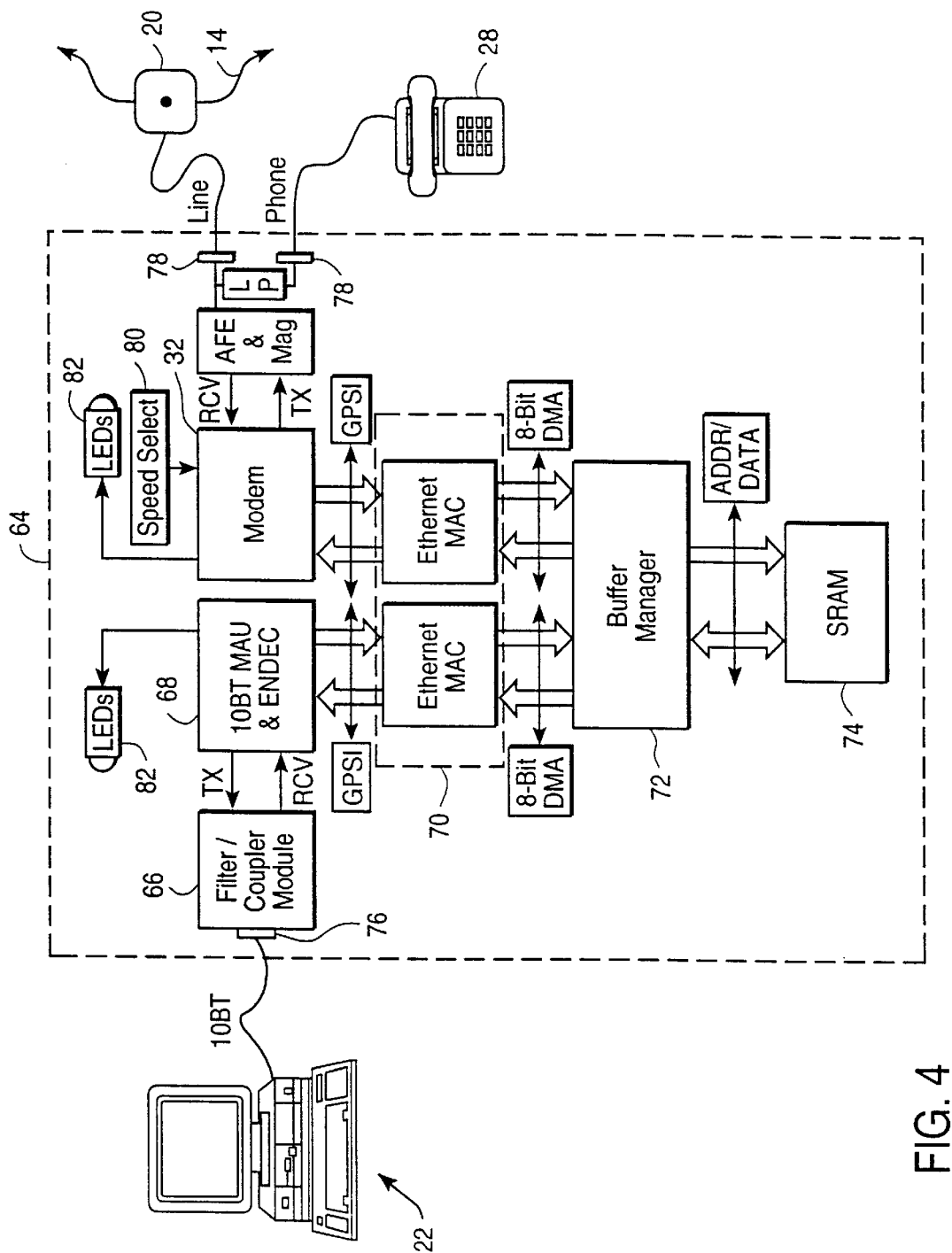
FIG. 4 is a block diagram illustrating a 10BaseT-to-POTS adapter, according to one embodiment of the present invention, including the modem illustrated FIG. 3.

FIG. 4 illustrates the modem 32 included within an adapter 64 which allows a computer 22 including a 10BaseT Ethernet communications controller 34 to communicate over a LAN implemented using POTS wiring 14. The adapter 64 includes a filter/coupler module 66, a 10BaseT Media Access Unit (MAU), an ENDEC 68, an Ethernet MAC Controller 70, a buffer manager 72, and a Static Random Access Memory (SRAM) 74. The adapter 64 acts as a non-filtering bridge, and receives packets from either interface, buffers such packets temporarily, and transmits them to the opposite interface as soon as possible. Specifically, the buffer manager 72 uses the SRAM 74 to emulate two large First In, First Out (FIFO) memories buffering packets being transferred between 10BaseT and the POTS wiring 14. In one embodiment, the adapter 64 does not have a MAC LAN address. The adapter 64 further includes a RJ-45 connector 76 for 10BaseT access, and two RJ-11 connectors 78. A speed selector 80 allows a user to configure the transmission speed of the adapter, and the adapter 64 further includes an array of diagnostic Light Emitting Diodes (LEDs) 82.

Access Identifiers

The present invention proposes implementing a collision detection protocol over a network, such as those illustrated in FIGS. 1a and 1b, which has an arbitrary topology, and unterminated branches. In one exemplary embodiment, a network 10 implements the Ethernet protocol and thus a CSMA/CD mechanism is invoked for every transmission over the network 10. In such a network 10, each networks station 30 includes an Ethernet communications controller 34, which provides the CSMA/CD mechanism. However, as detailed above, an arbitrary topology renders traditional collision detection methodologies unreliable. Specifically, the occurrence of reflections and noise on a network using POTS wiring as a carrier medium render traditional "carrier sense" methodologies and techniques unreliable. Accordingly, the present invention proposes that the adapter 64, as shown in FIG. 4, provide a "front-end" for the communications controller 34 which allows the detection of collisions in a manner which compensates for the unpredictability and arbitrary nature of a carrier medium.

Figure 5:
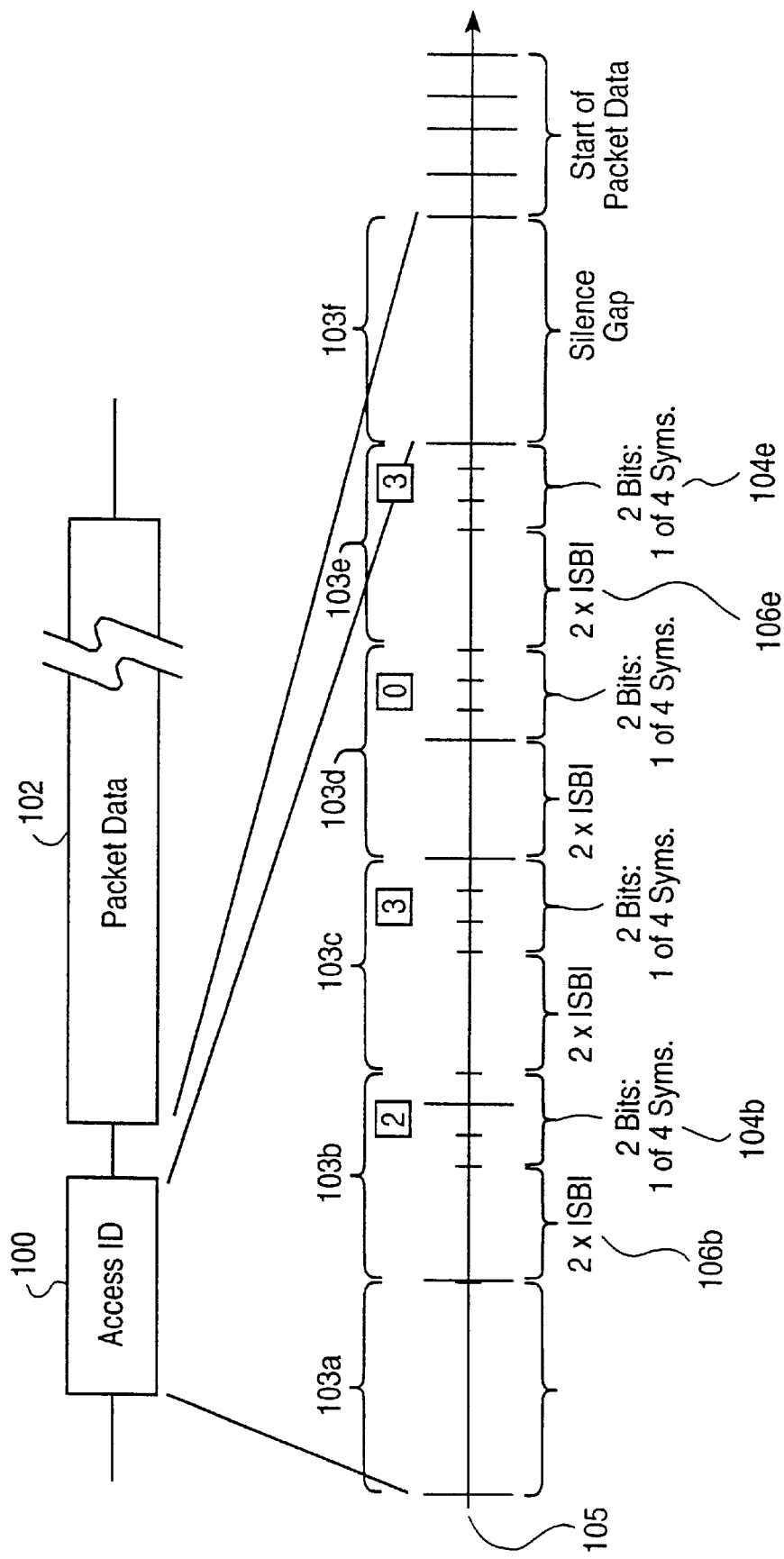
FIG. 5 is a diagrammatic representation of a signal transmitted from the modem of FIG. 3 and encoding an access identifier and packet data.

Merely for example, assuming that a maximum node separation of 500 feet is specified in the network 10, a "slot time" of no more than 2 microseconds may exist. The term "slot time" comprises twice the propagation delay between nodes, and indicates the maximum amount of time required by a node to capture the carrier medium. In order to facilitate the detection of signals transmitted by multiple stations within such a slot time, the present invention proposes assigning a unique access identifier 100 to each station. This access identifier encodes a unique identifier, and is transmitted from each station prior to the transmission of a data packet 102. Referring now to FIGS. 3 and 5, a data packet transmission commences when the communication controller 34 indicates to the modem 32 a desire to transmit by raising a transmission enable (TENA) signal. If the carrier medium is detected as being available (e.g., no transmitted pulses from other nodes have been seen on the POTS wiring for N microseconds), the access sequencer 48 causes the transmitter 50a to transmit the access identifier 100, which is unique to the network station 10. The access identifier 100 is substituted for a portion of a preamble transmission, which is conventionally transmitted from an Ethernet MAC controller at the beginning of a packet. The access identifier 100 encodes a unique 8-bit access identification number, which is encoded two bits at a time using, as shown in FIG. 5, four identifier portions 104b–e of a signal 105.

For the purposes of the specification, it is convenient to define a time unit in terms of which time intervals and temporal locations can be expressed. To this end, a time unit arbitrary termed a TIC is defined as comprising 0.1167 microseconds.

As shown in FIG. 5, in one exemplary embodiment, the access identifier 100 comprises (six) 6 intervals 103a–103f. The first interval 103b–103e each comprise a buffer or "dead time" portion 106 and an identifier portion 104. Each buffer portion 106 is twice the duration of an Intersymbol Blanking Interval (ISBI) which comprises 20 TICs. The ISBI is further defined and explained in co-pending application Ser. No. 08/925,043 (now issued as U.S. Patent No. 5,963,539), entitled "METHOD AND APPARATUS FOR ENCODING AND DECODING A BIT SEQUENCE FOR TRANSMISSION OVER POTS WIRING", filed Sep. 8, 1997, and assigned to the assignee of the present application.

The two bits encoded in each identifier portion 104 are encoded in the temporal location of a pulse within that identifier portion 104. For example, a pulse transmitted in the 66th TIC of an interval 103 encodes the bit sequence "00". Similarly, the bit sequences "01", "10", and "11", are encoded by pulses transmitted in the 86th, 106th and 126th TICs within an interval 103. For example, the identifier portion 104b includes a pulse transmitted in the 106th TIC of the interval 103b, and thus encodes the bit sequence "10".

The last interval 103f comprises a "silence gap" and contains no pulses. This silence gap is used for the detection of a "jam" pattern, as will be described below, and it is during this silence gap that all receivers 50b attain maximum sensitivity.

Figure 6:
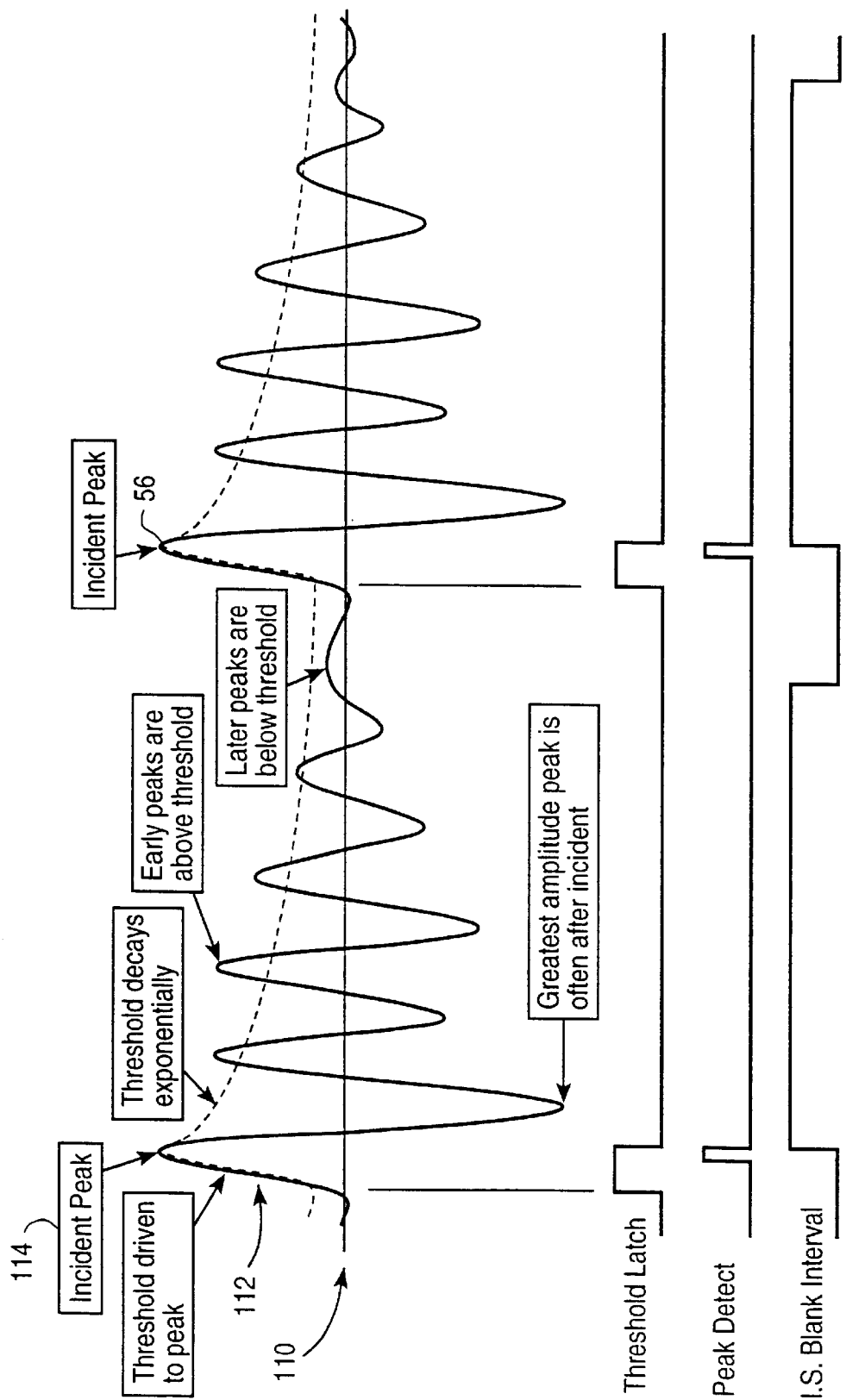

The respective buffer portions 106 are required to separate the pulses included within the identifier portions 104 by a predetermined time duration so as to allow for proper detection thereof by a receiver 50b. To this end, reference made to FIG. 6, which shows a waveform 110 of a signal received at a receiver 50b in response to the transmission of a pulse over a carrier medium, such as the POTS wiring 14. The waveform 110 includes a primary pulse 112 having an incident peak 114, followed by a series of decaying reflections. It will be appreciated that, in order to properly identify an access identifier 100 received as a receiver 50b, it is important that the true incident peak 114 be detected. As also shown in FIG. 6, it is conceivable that the reflections can result in a peak amplitude occurring sometime after the arrival of the incident energy. In order to allow the receiver 50b to determine the precise time of arrival of a first incident peak, sensitivity of the receiver 50b should be lessened, or the receiver 50b disabled, after detection of the incident peak. Accordingly, in one embodiment, the main receiver signal path comprises an amplifier followed by a differentiator (not shown). The amplifier may be necessary to compensate for the lower transmit levels required for compliance with FCC Part 68, and gain is accordingly fixed at about 15 dB. The output of the amplifier is fed to the differentiator whose output changes polarity whenever the input waveform's slope changes sign. The output of the differentiator is gated by both time and amplitude processing circuits within the receiver 50b. To further qualify the output of the differentiator, two (2) comparators and a threshold voltage generating circuit (not shown) detect the polarity of an incoming pulse. The comparators take as inputs the amplified waveform and a threshold voltage generated by the threshold voltage generating circuit. The comparators each receive an opposite phase of the amplified input waveform so that one comparator's output is active when the waveform exceeds the threshold voltage in a positive direction, and the other comparator's output is active when the waveform exceeds the threshold voltage in a negative direction. The threshold voltage generated by the threshold voltage generating circuit tracks the amplitude the incident peak, and is allowed to decay exponentially as shown in FIG. 5 and in a manner that roughly models the expected lowered amplitude responses of the received reflection pulses. A bias ensures that the threshold voltage can only sink to a minimum value representing the maximum sensitivity of the receiver 50b.

Regarding the initial setting of the threshold voltage, when a new waveform arrives at the receiver 50b, the amplified line voltage arises above, or falls below, the threshold voltage and causes one of the two comparators to again become active. This then sets the latch which remembers the polarity of the incident waveform, and disables the output of the other comparator until the receiver 50b is re-armed. The setting of the latch causes the threshold voltage to be driven to the peak voltage of the incident wave. The latch also arms an edge detector circuit (not shown) which is looking for a transition from the peak detector, indicating the arrival of a first incident peak. While waiting for the next pulse, the threshold voltage generating circuit output is in a high impedance state, allowing a capacitor to hold this threshold voltage. A bleed resistor causes this voltage to drain off, effectively increasing the sensitivity of the receiver 50b with the passing of time.

A further impediment to detecting pulses transmitted over an arbitrary topology carrier medium may result from the AGC action of the receiver 50b, which creates difficulties in the simultaneous transmission and reception of signals.

For the above reasons, the present invention proposes encoding identifiers using pulses separated by a minimum period comprising with the "dead time" buffer portion 106 of an interval 103. Specifically, each of the buffer portions 106 is of sufficient duration so as to allow the reflections of an incident pulse to decay below the above discussed threshold voltage, as illustrated FIG. 6.

Figure 7:
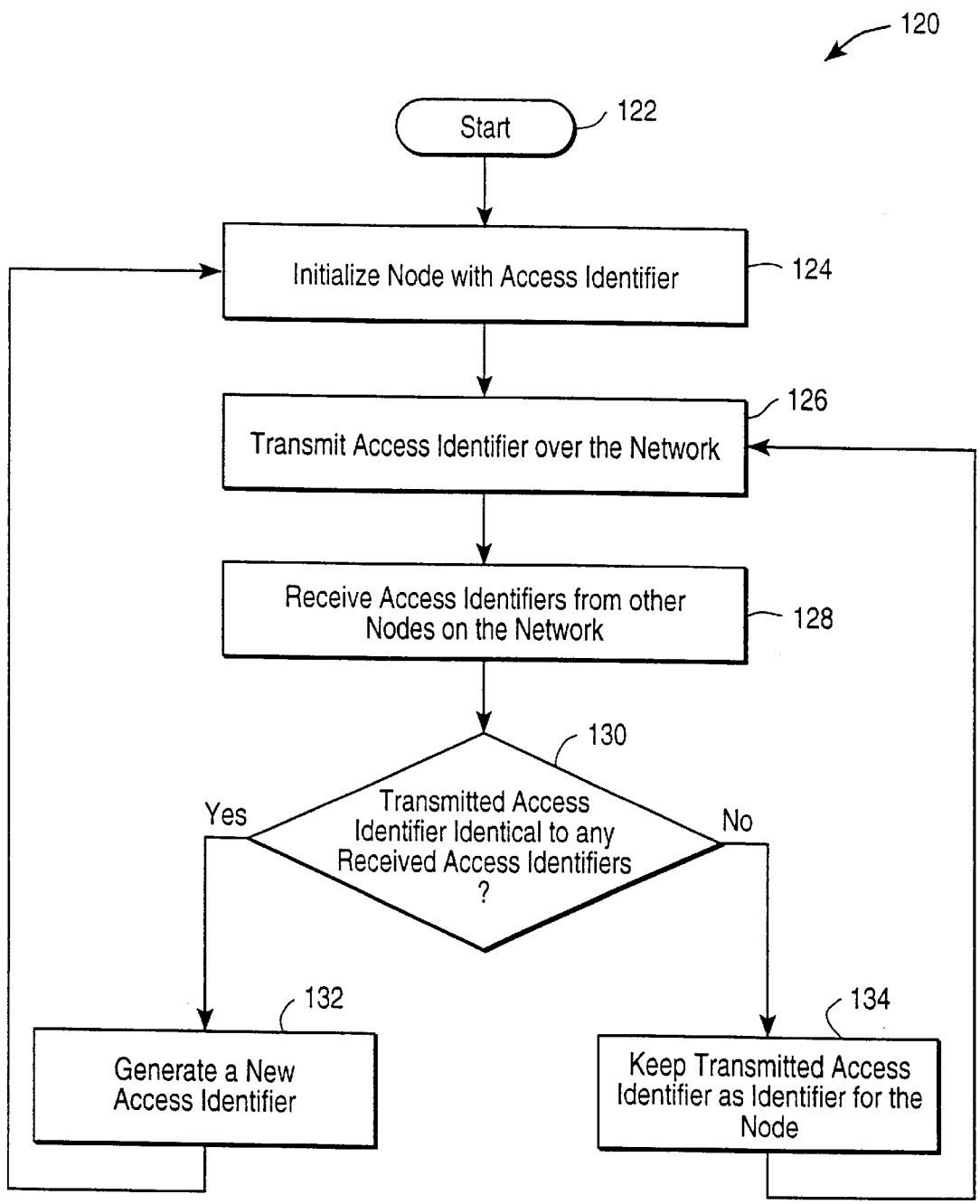
FIG. 7 is a flow chart illustrating a method, according to one embodiment of the present invention, of generating an access identifier for a node within a network.

Turning now to FIG. 7, there is illustrated a method 120 of automatically allocating an unique access identifier to each of the stations (or nodes) of the network 10. The method 120 is performed by each of the nodes included within such a network 10. After start step 122, the method 120 requires initializing the node with a predetermined access identifier at step 124. Specifically, each node maintains a pre-assigned access identifier within an internal register. At step 126, the node transmits this access identifier over the network 10 for detection by all other nodes of the network 10. At step 128, the node receives access identifiers propagated over the network 10 by other nodes, and then decodes these access identifiers to reveal identifier numbers encoded therein. At decision box 130, the node compares the number encoded into the access identifier with which it was initialized to the numbers decoded from the access identifiers received from other nodes in the network 10. If it is determined that any one of the access identifiers received from another node is identical to the access identifier with which is was initialized, the node generates a new, random 8-bit number from which is generated a new access identifier at step 132. The method loops from step 132 back to step 124, wherein the node is again initialized with this newly-generated identifier. Alternatively, should it be determined at decision box 130 that the internally-stored identifier number is unique on the network, the access identifier is maintained in step 134. The method 120 the loops back to step 126. Accordingly, during the course of normal network activity, nodes within the network will randomly change their access identifiers until all are unique. It will be appreciated that the access identifiers discussed above are required only for the purposes of collision detection among transmissions occurring from two nodes within the slot time.

Collision Detection

One exemplary embodiment of the present invention implements both transmit mode and receive mode collision detection, as required for operation of an Ethernet network over twisted-pair wiring. Specifically, transmit mode collision detection is performed by the nodes transmitting signals, whereas receive mode collision detection is performed by non-transmitting nodes of the network. Receive mode collision detection is also required for detection of collision across various segments, connected by repeaters, of the network. It will also be appreciated that the present invention may optionally be implemented in a network supporting only transmit mode collision detection.

Figure 8:
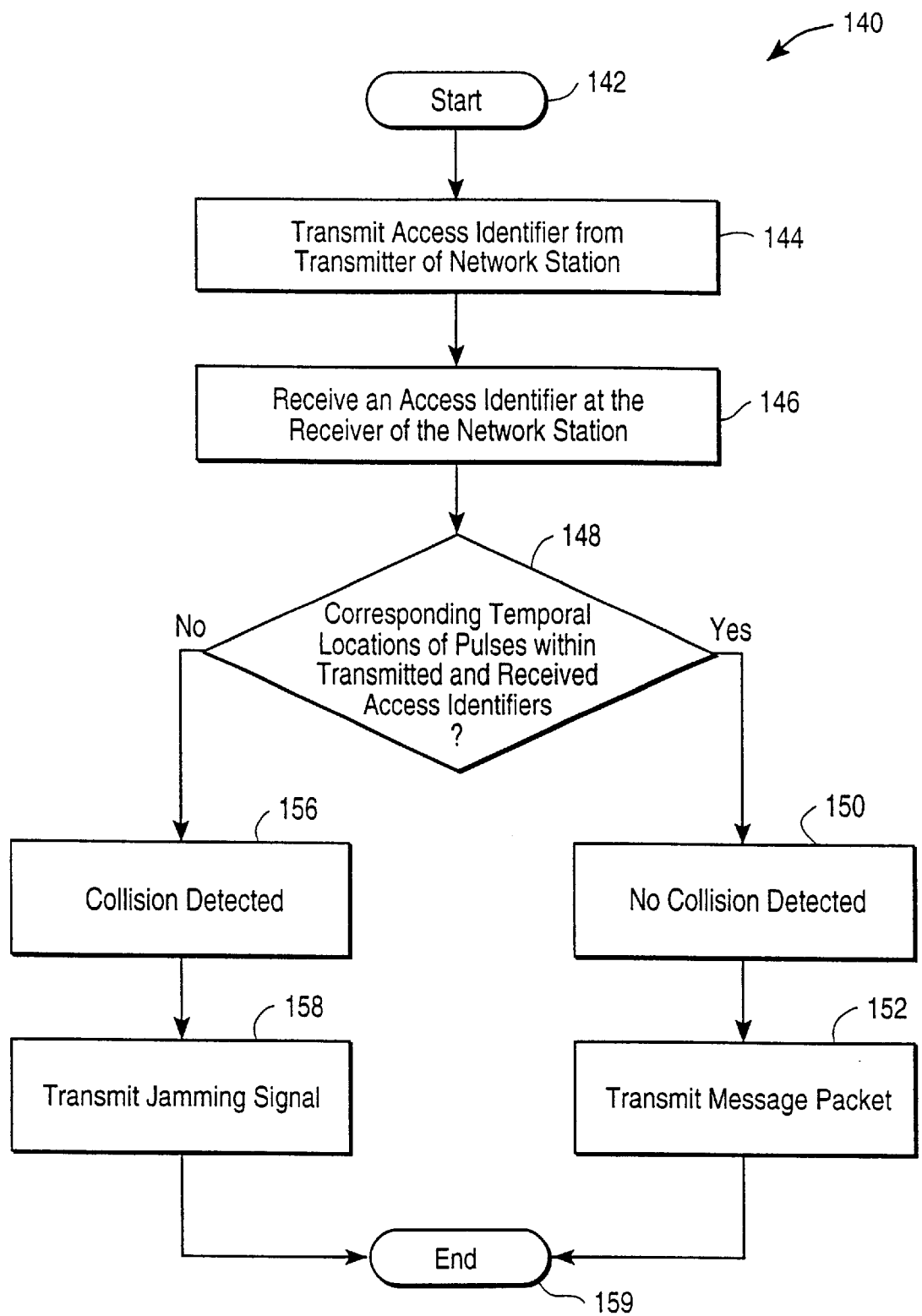
FIG. 8 is a flow chart illustrating a method, according to one embodiment of the present invention, of detecting a collision between signal transmissions on a carrier medium in a network.

Referring now to FIG. 8, there is illustrated a method 140, accordingly to one embodiment of the present invention, of detecting collisions between transmission signals on a carrier medium in a network. The method 140 is performed by each individual node of a network prior to transmission of a message package. The method 140 commences at step 142, and then proceeds to step 144, where a first access identifier is propagated from the transmitter 50a of the modem 32 of a first node onto the wiring 14, and then "looped back" and received at the receiver 50b of the transmitting modem 32. At step 146, a second node transmits a second access identifier on the wiring 14, within a predetermined slot time, the second access identifier then being received at the receiver 50b of the first node. In one embodiment of the invention, the slot time is defined to be 2 microseconds. It is unlikely that an access identifier will be received at the receiver 50b after the expiration of the slot time, as other nodes would by this time have detected that the subject node is transmitting.

The respective first and second access identifiers each have a predetermined duration, and include a number of pulses which encode a numeric identifier, as detailed above. Accordingly, it will be appreciated that pulses of the second access identifier will be received at the receiver 50b of the first node together with the pulses of the "looped back" first access identifier. The pulses of the first and second identifiers will be perceived by the receiver 50b as being interspersed, and to comprise a single "received" access identifier.

At decision box 148, a determination is made as to whether the temporal locations of the pulses within the transmitted and received access identifiers correspond. If the temporal locations of the pulses within the respective transmitted and received access identifiers do correspond (i.e., the pulses of the second access identifier are not interspersed with those of the first access identifier), the method proceeds to step 150, at which a "no collision" occurrence is detected as this indicates that only the first access identifier was received and that no second access identifier was transmitted. The subject node then proceeds to transmit the message packet at step 152, and the method terminates at step 154.

On the other hand, should it be determined at decision box 148 that the temporal locations of pulses within the transmitted and received identifiers do not correspond (i.e., pulses from the second access identifier are interspersed with those from the first access identifier), the method proceeds to step 156, at which a "collision" occurrence is detected. Thereafter, the method proceeds to step 158, wherein the subject node transmits a jamming signal so as to facilitate receive mode collision detection by idle nodes of the network. The jamming signal is transmitted by the transmitter 50a until signaled by the communications controller 34 to cease transmission of this signal.

Figure 9:
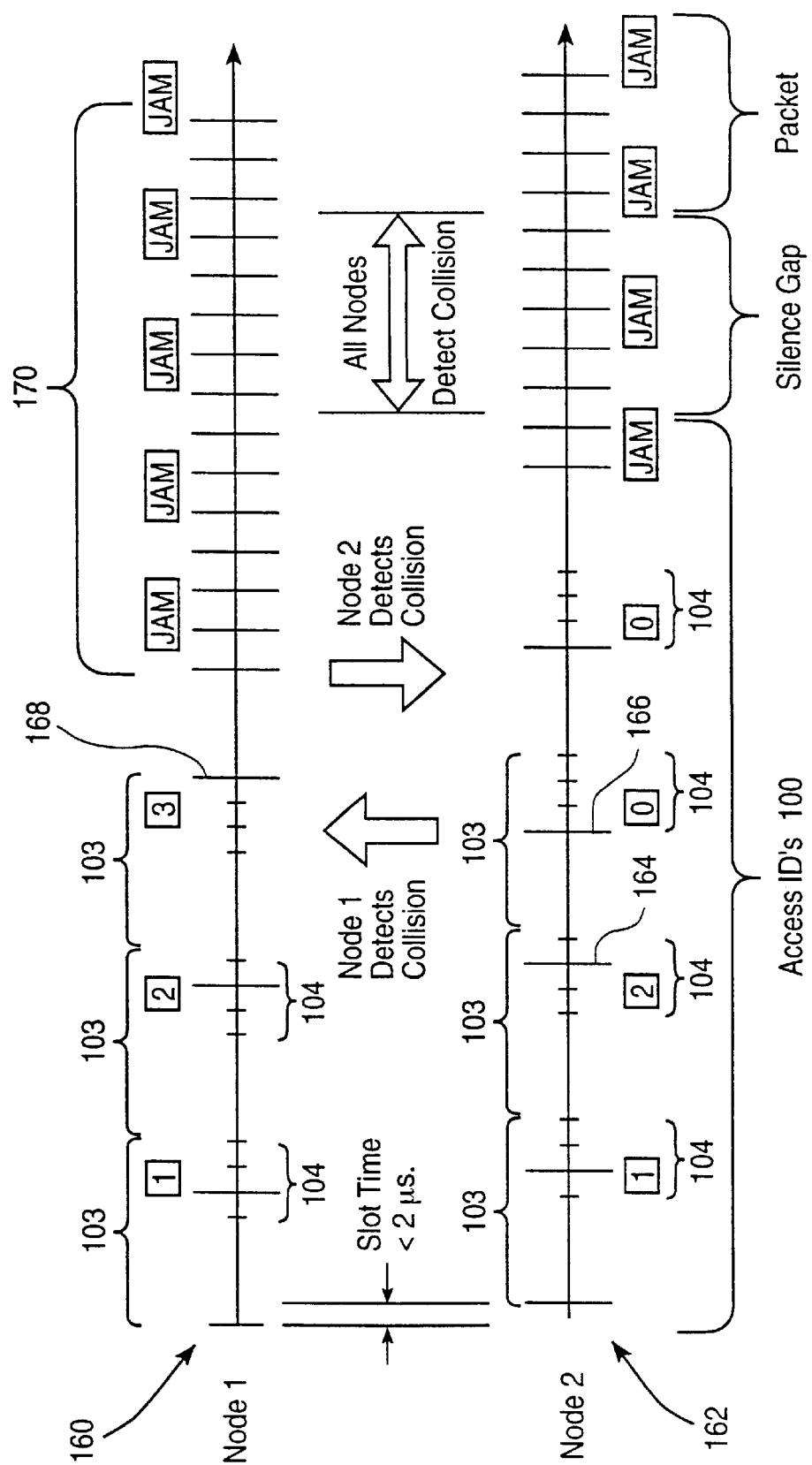
FIG. 9 illustrates signal transmissions from two respective nodes of a network, and illustrates the detection of a collision utilizing these signals.
Figure 10A:
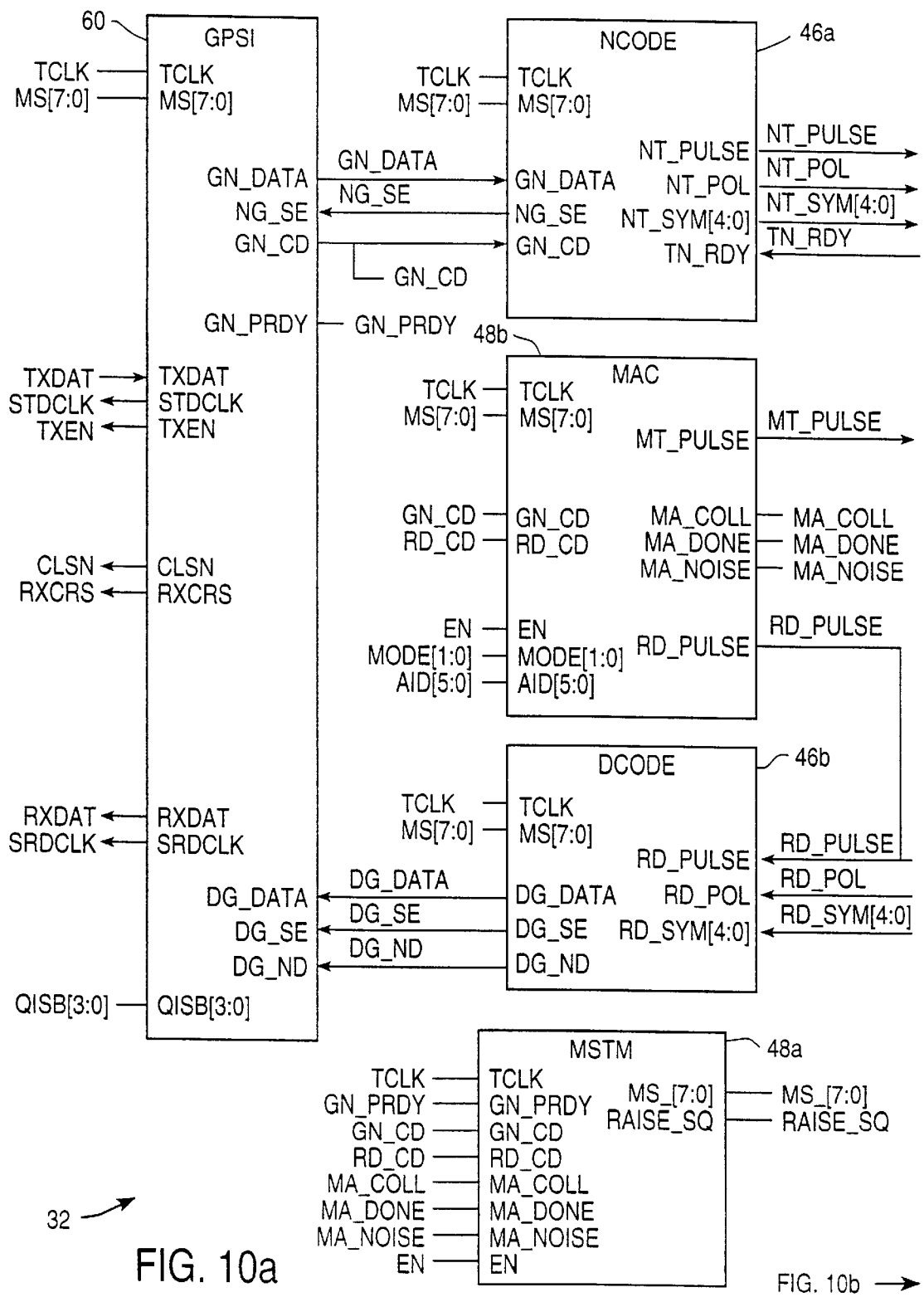
FIG. 10 is a schematic representation of one embodiment, according to the present invention, of the modem shown in FIG. 3.
Figures 10A, 10B:
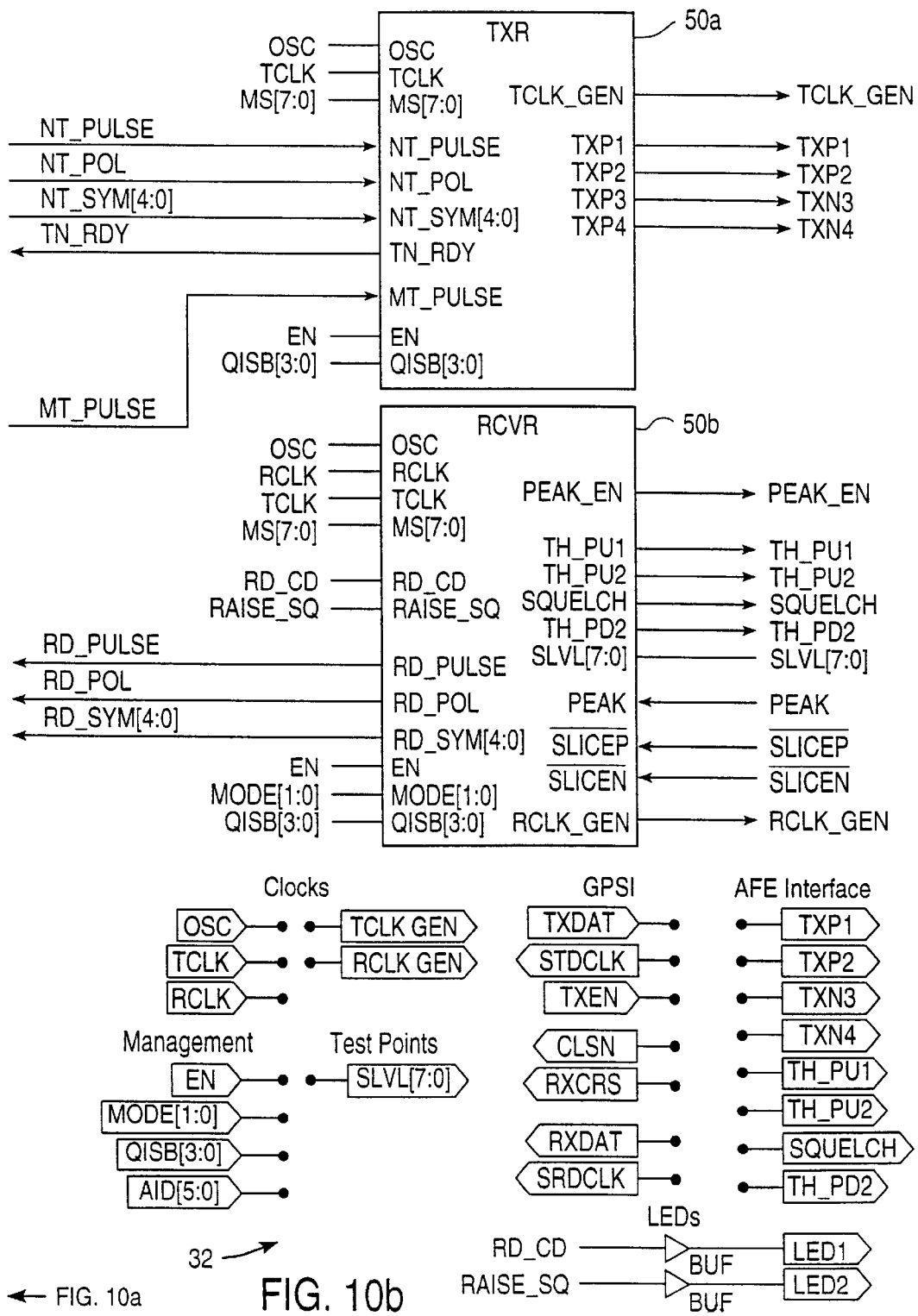

The method 140 will now be further described with reference to FIG. 9, which provides an illustrative example of a collision between respective signals 160 and 162 transmitted by two nodes, namely Node 1 and Node 2, within a network. Node 1 begins transmission of the signal 160 by propagation of an access identifier 100 identifying Node 1. Within a predetermined slot time, Node 2 similarly begins transmission of the signal 162 by propagation of an access identifier 100 identifying Node 2. As shown, the identifier portions 104 of the first and second intervals 103 of signals 160 and 162 are identical, and accordingly no collision is detected by Node 1 on receipt of these first or second intervals 103. However, it will be noted that the respective third intervals 103 of the signals 160 and 162 differ, in that the temporal locations of the pulses included within the identifier portions 104 differ. Accordingly, on reception of the third interval 103 of signal 162, Node 1 detects a collision as the pulse of this third interval 103 is located, for example, in the 66th TIC, whereas the pulse of the third interval 103 of signal 160 is located in the 126th TIC. It will be noted that the buffer portion 106 included within each interval 103 provides time for the ringing from the previous pulse to completely die out before the next pulse is sent. Node 2 does not detect a collision on receipt of pulse 168, as the "dead time" or blanking interval (comprising twice the ISBI) has not as yet expired and the receiver is not sensitive (or is switched OFF) during the blanking interval. Accordingly, a collision is detected when a signal pulse is received from another node during a period of receiver sensitivity (i.e., immediately prior to transmitting the next symbol of an access identifier). After Node 1 detects the collision, a jamming signal 170, comprising a continuous and evenly-spaced sequence of pulses, is transmitted from the transmitter 50a of Node 1. The first pulse 172 of the jamming signal 170 causes Node 2 to detect a collision, as the receiver 50b thereof is again re-enabled after the blanking interval. After detection of the collision, Node 2 similarly begins to transmit a jamming signal 170. The jamming signals 170 allow non-transmitting (or passive) nodes within the network 10 to detect the collision when they receive pulses during the interval 103f (i.e., the "silence gap"), which is silent in the absence of a collision.

Exemplary Embodiment

Figure 11:
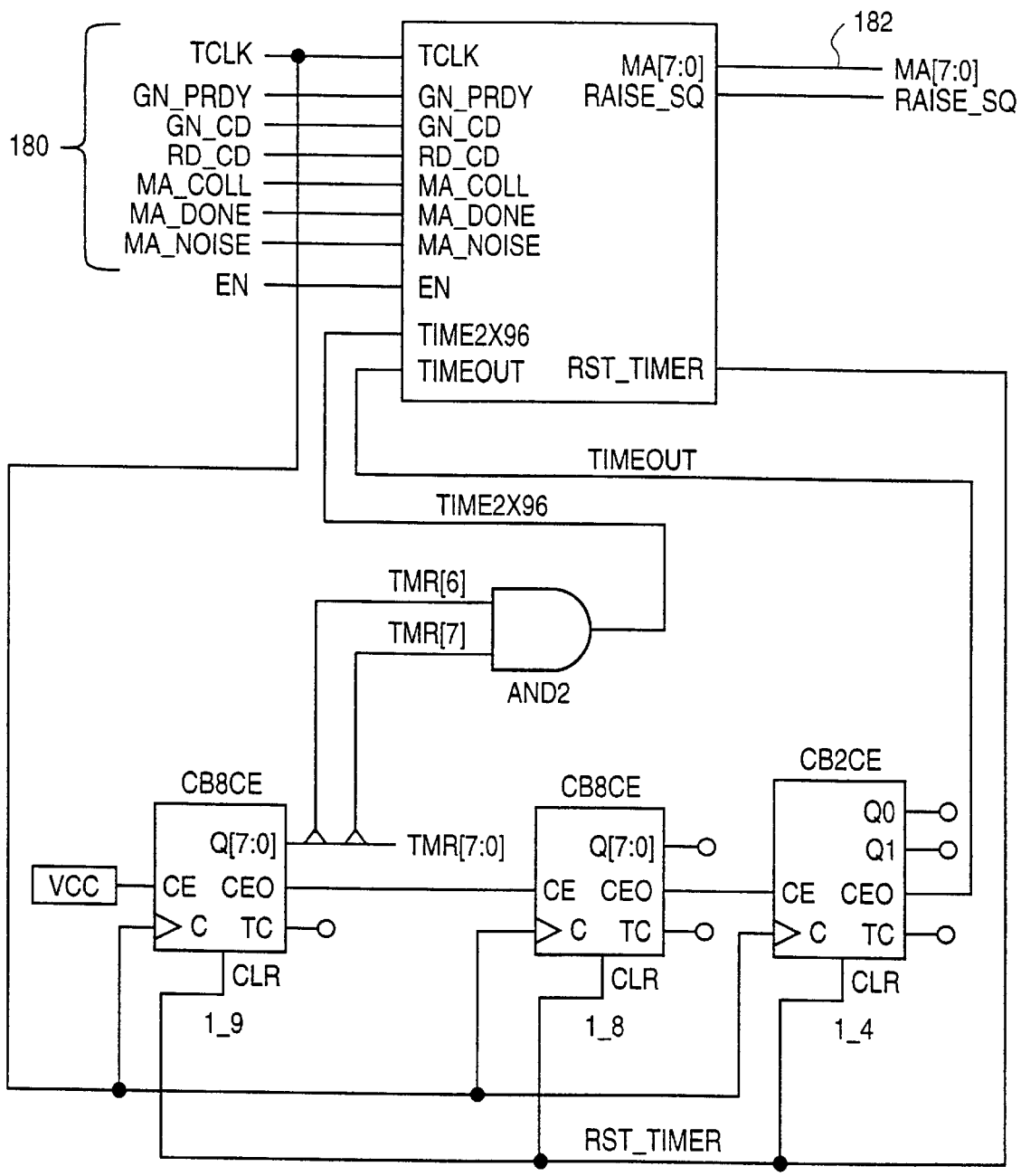
FIG. 11 is a schematic representation of a master state machine included within the modem illustrated in FIG. 10.
Figure 12:
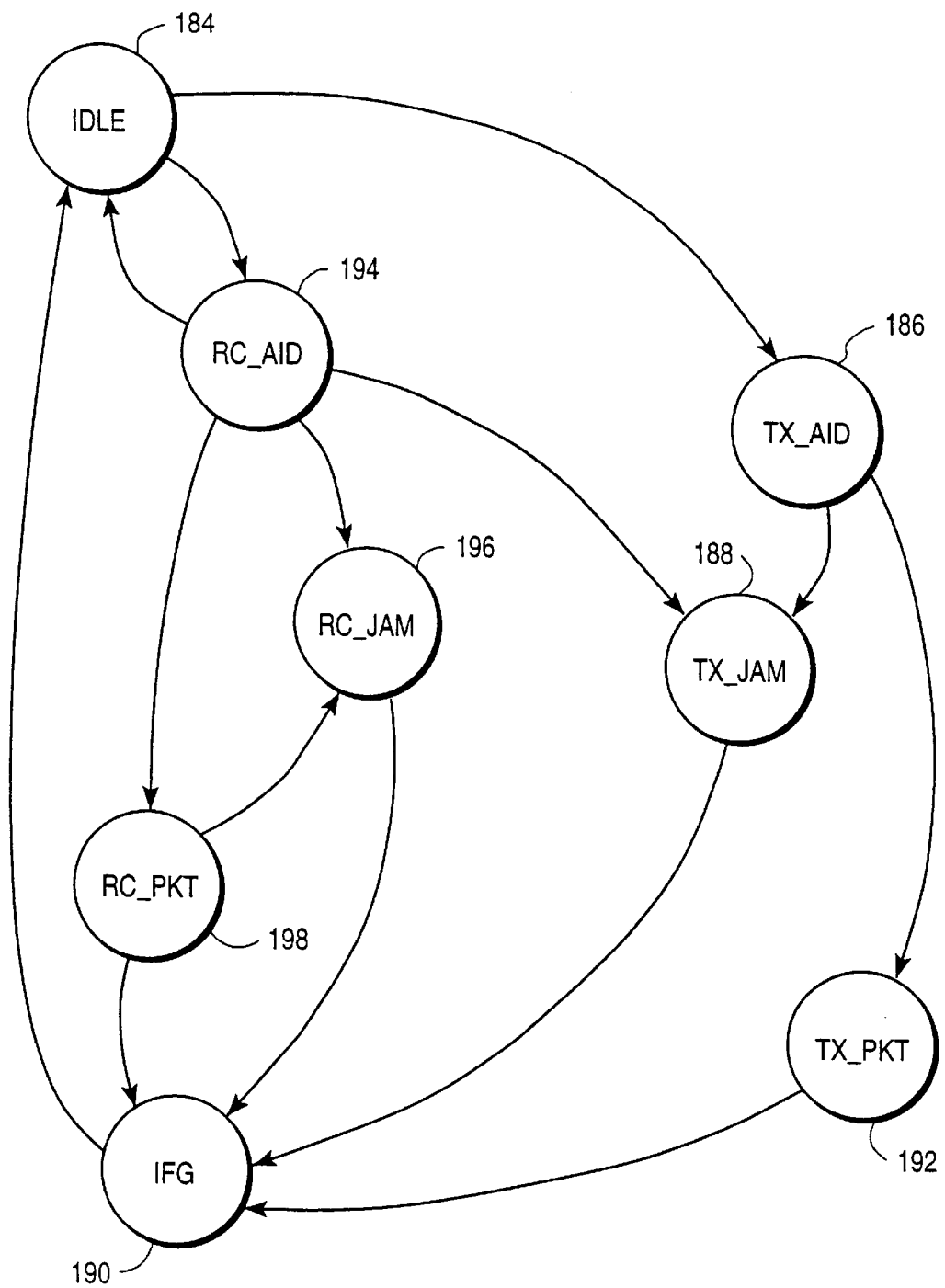
FIG. 12 is a state diagram illustrating the various operational states of the modem shown in FIG. 10.

FIGS. 10–14 illustrate an exemplary embodiment of the modem 32 implemented using Field Programmable Gate Arrays (FPGAs). The access sequencer 48 is shown to comprise a Master State Machine (MSTM) 48a and a Media Access Controller (MAC) 48b. Referring now specifically to FIGS. 11 and 12, the basic function of the MSTM 48a is to control the flow of data between the wire 14 and an Ethernet communications controller 34. The MSTM 48a receives the number of inputs 180 from encoder 46a, decoders 46b, receiver 50a and the transmitter 50b, and outputs a master state signal (MS[7:0]) 182, which indicates one of eight operational states illustrated in FIG. 12, to other functional units of the modem 32. Referring to the state diagram shown in FIG. 12, when the modem is in an idle state (IDLE) 184, the modem waits for the Ethernet communications controller 34 to being packet transmission or for a packet to be received off the wire 14. Should the controller 34 begin packet transmission, the modem 32 enters a transmit access identifier (TX_AID) state 186, in which the MAC 48b causes an access identifier, as detailed above, to be transmitted over the wiring 14. If a collision is sensed, then a transmit jam (TX_JAM) state 188 is entered. In the state 188, the MAC 48b sends the above described jamming signal 170, until the Ethernet controller 34 stops transmitting. Once the MAC 48b terminates transmission of the jam signal 170 and the wire is clear, the modem enters an interframe gap (IFG) state 190. In the IEG state 190, the GPSI 60 runs the Ethernet communications controller 34 at a relatively high clock speed, so as to shrink a minimum interframe gap seen on the wire 14. This has the advantage of saving time which is used by the access identifier transmission.

Returning to state 186, if no collision is detected, then the modem 32 enters the transmit packet (TX_PKT) state 192. In state 192, the modem transmits a message packet, and remains in this state until no carrier is sensed in the wire, meaning that the last bit of the message packet has been found and encoded, and that all looped back symbols have cleared the receiver 50b. The modem 32 then moves from state 192 to the IFG state 190.

The receive access identifier (RC_AID) state 194 is entered into when an incoming packet is detected. For example, an incoming packet may be detected by detecting two pulses 14.93 microseconds apart. If a jamming signal 170 is detected during the above described silence interval of the access identifier, a receive jam (RC_JAM) state 196 is entered. The modem 32 remains in the receive jam state 196 until the wire 14 is quiet. Thereafter, the IFG state 190 is entered.

Alternatively, when in the receive access identifier state 194, should the Ethernet communications controller 34 begin to transmit, the transmit jam state 188 is entered. Alternatively, should a collision not be signaled by the MAC 48b when in the receive access identifier state 194, the modem enters a receive packet (RC_PKT) state 198. When in the receive packet state 198, an incoming packet is decoded and sent to the Ethernet communications controller 34. The modem 32 then progresses from state 198 to the IFG state 190 when no more pulses are detected on the wire 14.

Figure 13:
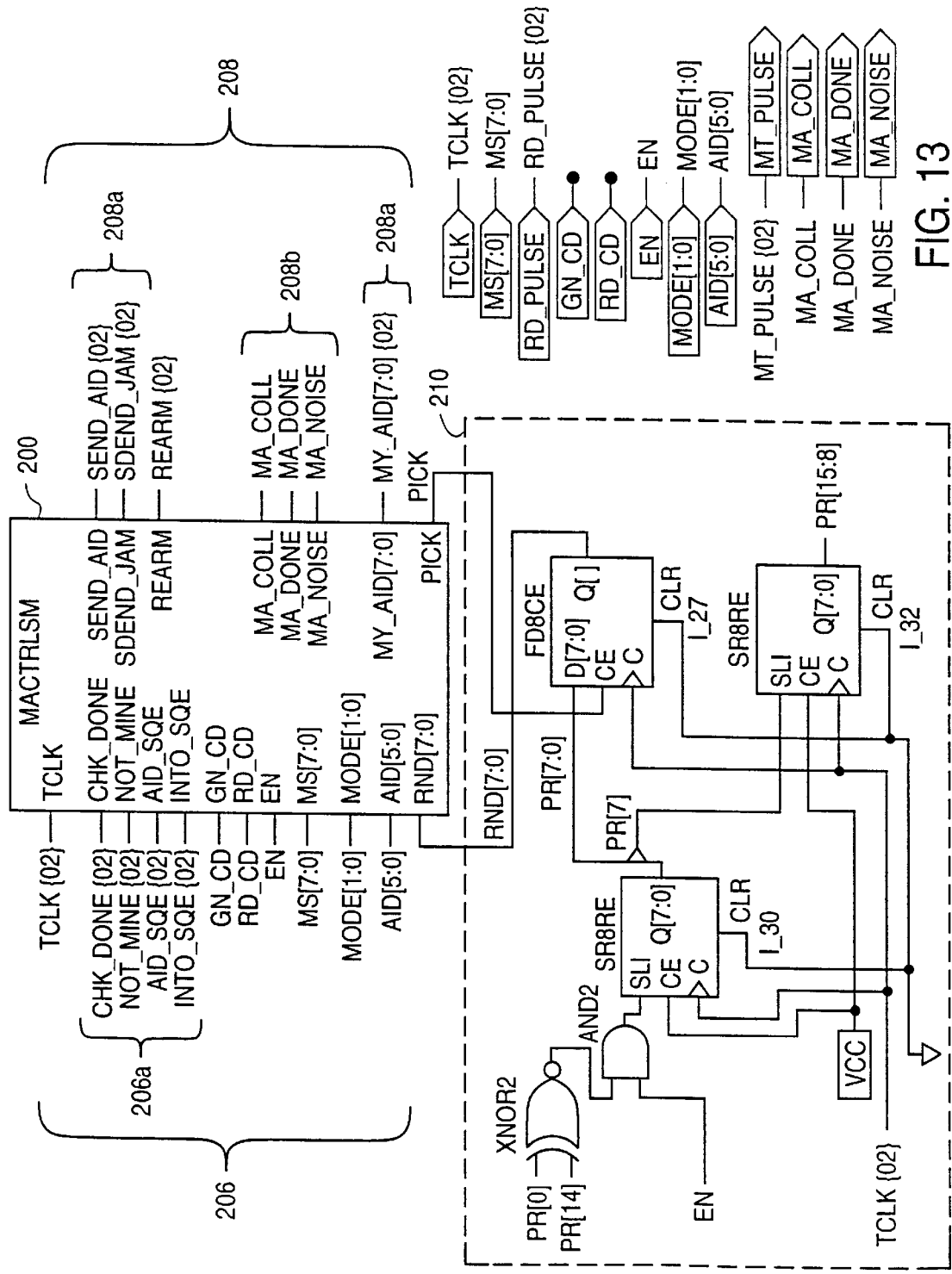

Referring now to FIGS. 13 and 14, the MAC 48b includes a MAC control state machine 200, a transmit access identifier state machine 202 and a check access identifier state machine 204. The MAC control state machine 200 acts as an intermediary between, and controller for, the state machines 202 and 204. The state machine 200 further receives the inputs 206, including the inputs 206a from the check access identifier state machine 204, and generates the outputs 208, including the outputs 208a to the transmit access identifier state machine 202 and the outputs 208b to the master state machine 48a. Further details regarding the inputs 206 and the outputs 208 of the MAC control state machine 200 are provided below in Tables 3 and 4.

TABLE 3

| INPUT SIGNAL | DESCRIPTION |
| --- | --- |
| TCLK | This is the TIC clock which drives the modem 32. |
| MS[7:0] | This signal is generated by the master state machine 48a, and indicates the master state of the modem 32. |
| AID[5:0] | This is the original access identifier of the node, as supplied via a management interface from the Ethernet controller 34. |
| CHK_DONE | This signal is generated by the state machine 204 to indicate completion of a check action. |
| NOT_MINE | Assertion of this signal indicates that the state machine 204 has located another node's access identifier. |
| AID_SQE | Assertion of this signal indicates that the state machine 204 has located a signal quality error, probably due to a collision. |
| INTO_SQE | Assertion of this signal indicates that the state machine 204 has detected a noise pulse. |
| GN_CD | The controller 34 sets the signal to indicate that it is sending data. |
| RD_CD | Assertion of this signal indicates a Carrier Detect to the controller 34 by the receiver 50b. |
| EN | This is the Master Enable Signal. |
| RND[7:0] | The circuitry 210 in FIG. 13 inputs a random number as a substitute for the access identifier supplied from the Ethernet controller 34, as is described below. |

TABLE 4

| OUTPUT SIGNAL | DESCRIPTION |
| --- | --- |
| MY_AID[7:0] | This signal indicates the access identifier currently in use. |
| SEND_AID | Assertion of this signal instructs the state machine 202 to transmit the access identifier. |
| SEND_JAM | Assertion of the signal instructs the state machine 202 to send the jam signal 170. |

TABLE 4-continued

| OUTPUT SIGNAL | DESCRIPTION |
|---|---|
| MA_COLL | This signal is asserted to inform the master state machine 48a that a collision has been detected. |
| MA_DONE | Assertion of the signal informs the master state machine 48a that an access identifier has been transmitted or received. |
| PICK | This signal is asserted to generate a further random and substitute access identifier. |
| REARM | Assertion of this signal resets the check access identifier state machine 204. |

The PICK signal mentioned above is used when the MAC 48b senses a transmission by another node using the same access identifier. Assertion of the PICK signal causes a new and substitute access identifier to be generated by a pseudo-random number generator.

The transmit access identify state machine 202 is coupled to receive the inputs 212, and to output the signal MT_PULSE 214, which propagates pulses encoding the access identifier on the wiring 14. Specifically, the output signal 214 comprises in part the access identifier 100, in the form of series of pulses which are spaced far enough apart so that two nodes transmitting at the same time, but with different access identifiers, can detect one another as described above. The access identifier 100 included in the output signal 214 is encoded as described above with reference to FIG. 5.

The check access identifier state machine 204 is coupled to receive the input signals 216, which include RD_PULSE signal 216a. The RD_PULSE signal 126a may include a series of pulses, received at the receiver 50b which encode an access identifier 100. The state machine 204 provides the outputs 218 to the MAC control state machine 200, as described above.

Thus, a method and apparatus for detecting collisions between signals on a network have been described. Although the present invention has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A method of detecting a collision on a network, the method including:
   transmitting a first identifier of a first network device from the first network device over a transmission medium, the first identifier comprising a first series of pulses transmitted over a first time interval, each pulse having a respective temporal location within the first time interval;
   receiving a second identifier at the first network device, the second identifier comprising a second series of pulses received over a second time interval; and
   determining whether the second identifier corresponds to the first identifier, and if not, then detecting a collision on the transmission medium,
   wherein the determining of whether the second identifier corresponds to the first identifier includes determining whether the respective temporal locations, within the first time interval, of each pulse of the first series corresponds to a respective temporal location, within the second time interval, of a pulse of the second series of pulses.

2. The method of claim 1 wherein each of the pulses of the first series is temporaly spaced from an adjacent pulse by a minimum blanking interval.

3. The method of claim 1 wherein the first identifier comprises a plurality of intervals of equal duration, each interval including at least one pulse the temporal location of which encodes a portion of a binary identifier number for the first network device.

4. The method of claim 3 wherein each interval includes a blanking interval and a pulse interval, the pulse interval including a plurality of temporal pulse locations.

5. The method of claim 4 wherein the pulse interval includes at least one pulse at one of the plurality of temporal pulse location.

6. The method of claim 1 including transmitting, from the first network device and on the transmission medium, a jamming signal upon the detection of a collision on the transmission medium.

7. The method of claim 6 wherein the jamming signal comprises a series of pulses spaced at regular intervals.

8. The method of claim 1 including establishing a silence gap, in which no pulses are transmitted, after transmission of the first identifier from the first network device over the transmission medium.

9. The method of claim 8 including detecting a collision on the transmission medium if a pulse is received at the first network device during the establishment of the silence gap.

10. The method of claim 1 including inhibiting a capability of the first network device to detect a pulse greater that a predetermined amplitude after detection of a pulse within the second identifier.

11. The method of claim 10 including decreasing the predetermined amplitude over a time interval.

12. A network device comprising:
   a transmitter to transmit a first identifier of the network device over a communications medium, the first identifier comprising a first series of pulses transmitted over a first time interval, each pulse having a respective temporal location within the first time interval;
   a receiver to receive, via the communications medium, a second identifier comprising a second series of pulses received over a second time interval; and
   logic to determine whether the second identifier corresponds to the first identifier and, if not, to detect a collision on the communications medium, wherein the logic determines whether the respective temporal locations, within the first time period, of each pulse of the first series of pulses corresponds to a respective temporal location, within the second time interval, of a pulse in the second series of pulses.

13. The network device of claim 12 wherein the logic is to construct the first identifier so that each of the pulses of the first series is temporaly spaced from an adjacent pulse by at least a minimum blanking interval.

14. The network device of claim 12 wherein the logic is to construct the first identifier as a plurality of intervals of equal duration, each interval encoding a portion of a binary identifier number associated with the network device.

15. The network device of claim 14 wherein each interval comprises a blanking interval and a pulse interval, the pulse interval including a plurality of temporal pulse locations.

16. The network device of claim 15 wherein the pulse interval includes at least one pulse at one of the plurality temporal pulse locations.

17. The network device of claim 12 wherein the transmitter is to transmit a jamming signal upon detection of the collision on the communications medium, the jamming signal comprising a series of pulses spaced at regular intervals.

18. The network device of claim 12 wherein the transmitter is to establish a silence gap, during which no pulses are transmitted, following the transmission of the first identifier and the logic is to detect a collision on the communications medium if a pulse is received at the network device during the establishment of the silence gap.

19. The network device of claim 12 wherein the receiver is not to detect a pulse having an amplitude greater than a predetermined amplitude subsequent to detection of a pulse within the second identifier.

20. The network device of claim 19 including a threshold circuit to decrease the predetermined amplitude over a time interval.

21. An apparatus comprising:

first means for transmitting a first identifier for a first network device over a communications medium, the first identifier comprising a series of pulses transmitted over a first time interval, each pulse having a respective temporal location within the first time interval;

second means for receiving, via the communications medium, a second identifier comprising a second series of pulses received over a second time interval; and third means for determining whether the second identifier corresponds to the first identifier and, if not, then for detecting a collision on the communications medium, wherein the third means is for determining whether the respective temporal locations, within the first time interval, of each pulse in the first series of pulses corresponds to a respective temporal location, within the second time interval, of a pulse within the second series of pulses.

* * * * *

UNITED STATES PATENT AND TRADEMARK OFFICE
CERTIFICATE OF CORRECTION

PATENT NO. : 6,381,213 B1
DATED : April 30, 2002
INVENTOR(S) : Webber, Jr. et al.

It is certified that error appears in the above-identified patent and that said Letters Patent is hereby corrected as shown below:

Column 3,
Line 19, delete "to,be" and insert -- to be --.

Signed and Sealed this

Twenty-ninth Day of October, 2002

Attest:

Attesting Officer

JAMES E. ROGAN
Director of the United States Patent and Trademark Office